US008566526B2

(12) United States Patent  
Wang et al.

(10) Patent No.: US 8,566,526 B2
(45) Date of Patent: *Oct. 22, 2013

(54) COMBINED TRANSPARENT/NON-TRANSPARENT CACHE

(75) Inventors: James Wang, Vista, CA (US); Zongjian Chen, Palo Alto, CA (US); James B. Keller, Redwood City, CA (US); Timothy J. Millet, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/545,526

(22) Filed: Jul. 10, 2012

(65) Prior Publication Data

US 2012/0278557 A1 Nov. 1, 2012

Related U.S. Application Data

(63) Continuation of application No. 12/500,747, filed on Jul. 10, 2009, now Pat. No. 8,244,981.

(51) Int. Cl.
*G06F 13/00* (2006.01)
(52) U.S. Cl.
USPC .......................... 711/129; 711/117; 711/170
(58) Field of Classification Search
USPC ......... 711/117–118, 128–130, 136, 139, 145, 711/160
See application file for complete search history.

(56) References Cited

U.S. PATENT DOCUMENTS

| 5,913,224 | A | 6/1999 | MacDonald |
| 6,484,237 | B1 | 11/2002 | Agarwala et al. |
| 6,732,234 | B1 | 5/2004 | Rowlands et al. |
| 6,986,010 | B2 | 1/2006 | Sutanto et al. |
| 7,266,648 | B2 | 9/2007 | Sutanto et al. |
| 7,318,114 | B1 | 1/2008 | Cypher |
| 8,244,981 | B2 * | 8/2012 | Wang et al. .................. 711/128 |
| 2003/0028728 | A1 * | 2/2003 | Ito .................. 711/118 |
| 2011/0010520 | A1 | 1/2011 | Wang |

FOREIGN PATENT DOCUMENTS

| EP | 1 179 779 | 2/2002 |
| WO | 2010/004497 | 1/2010 |

OTHER PUBLICATIONS

Office Action from U.S. Appl. No. 12/500,810, mailed Dec. 12, 2011, Apple Inc., 8 pages.

* cited by examiner

*Primary Examiner* — Tuan Thai
*Assistant Examiner* — Zhuo Li
(74) *Attorney, Agent, or Firm* — Lawrence J. Merkel; Meyertons, Hood, Kivlin, Kowert & Goetzel, P.C.

(57) ABSTRACT

In one embodiment, a memory that is delineated into transparent and non-transparent portions. The transparent portion may be controlled by a control unit coupled to the memory, along with a corresponding tag memory. The non-transparent portion may be software controlled by directly accessing the non-transparent portion via an input address. In an embodiment, the memory may include a decoder configured to decode the address and select a location in either the transparent or non-transparent portion. Each request may include a non-transparent attribute identifying the request as either transparent or non-transparent. In an embodiment, the size of the transparent portion may be programmable. Based on the non-transparent attribute indicating transparent, the decoder may selectively mask bits of the address based on the size to ensure that the decoder only selects a location in the transparent portion.

20 Claims, 7 Drawing Sheets

50

52

COMBINED TRANSPARENT/NON-TRANSPARENT CACHE

This application is a continuation of U.S. patent application Ser. No. 12/500,747, filed Jul. 10, 2009 now U.S. Pat. No. 8,244,981, incorporated herein by reference in its entirety.

BACKGROUND

1. Field of the Invention

This invention is related to the field of integrated circuits, and more particularly to integrated circuits with on-chip memories.

2. Description of the Related Art

Various types of integrated circuits include on-chip memories. For example, integrated circuits can include caches. Integrated circuits that include processors often include caches to provide low latency access to a subset of the data that is also stored in off-chip memories. Generally, caches are hardware-managed memories that store the most recently used data, and the cache management hardware writes copies of data accessed by the processors (or other memory-reading devices in the integrated circuit) to the cache. Data that has been modified can be replaced in the cache by newer data, and the cache management hardware can write the modified data back to the main memory. In some cases, the processors can include prefetch instructions and other cache hints to influence the operation of the cache management hardware and can mark memory non-cacheable to prevent caching, but generally software cannot control the cache management hardware.

Another type of on-chip memory is embedded memory or "local memory". Such memory is under software control (i.e. software reads and writes the memory and thus directly controls which data is stored in the embedded memory). The embedded memory can have lower latency that external memory, and if the data stored in the embedded memory is accessed frequently, power savings can be achieved as compared to accessing external memory.

SUMMARY

In one embodiment, an integrated circuit includes a memory that is delineated into transparent and non-transparent portions. The transparent portion may be controlled by a control unit coupled to the memory, along with a corresponding tag memory. The non-transparent portion may be software controlled by directly accessing the non-transparent portion via an input address, without a tag match. In an embodiment, the memory may include a decoder configured to decode the address and select a location in either the transparent or non-transparent portion. Each request may include a non-transparent attribute identifying the request as either transparent or non-transparent. In an embodiment, the size of the transparent portion may be programmable. Based on the non-transparent attribute indicating transparent, the decoder may selectively mask bits of the address based on the size to ensure that the decoder only selects a location in the transparent portion. In an embodiment, software may assign an address range to the non-transparent portion that decodes to select only locations in the non-transparent portion of the memory.

In some embodiments, providing a programmable size of the transparent portion may permit cache sizing based on the workload being experienced by the integrated circuit. The remaining portion of the memory may be used as non-transparent memory, and thus the entirety of the memory may be useable for any desired cache size.

BRIEF DESCRIPTION OF THE DRAWINGS

The following detailed description makes reference to the accompanying drawings, which are now briefly described.

Figure 1:
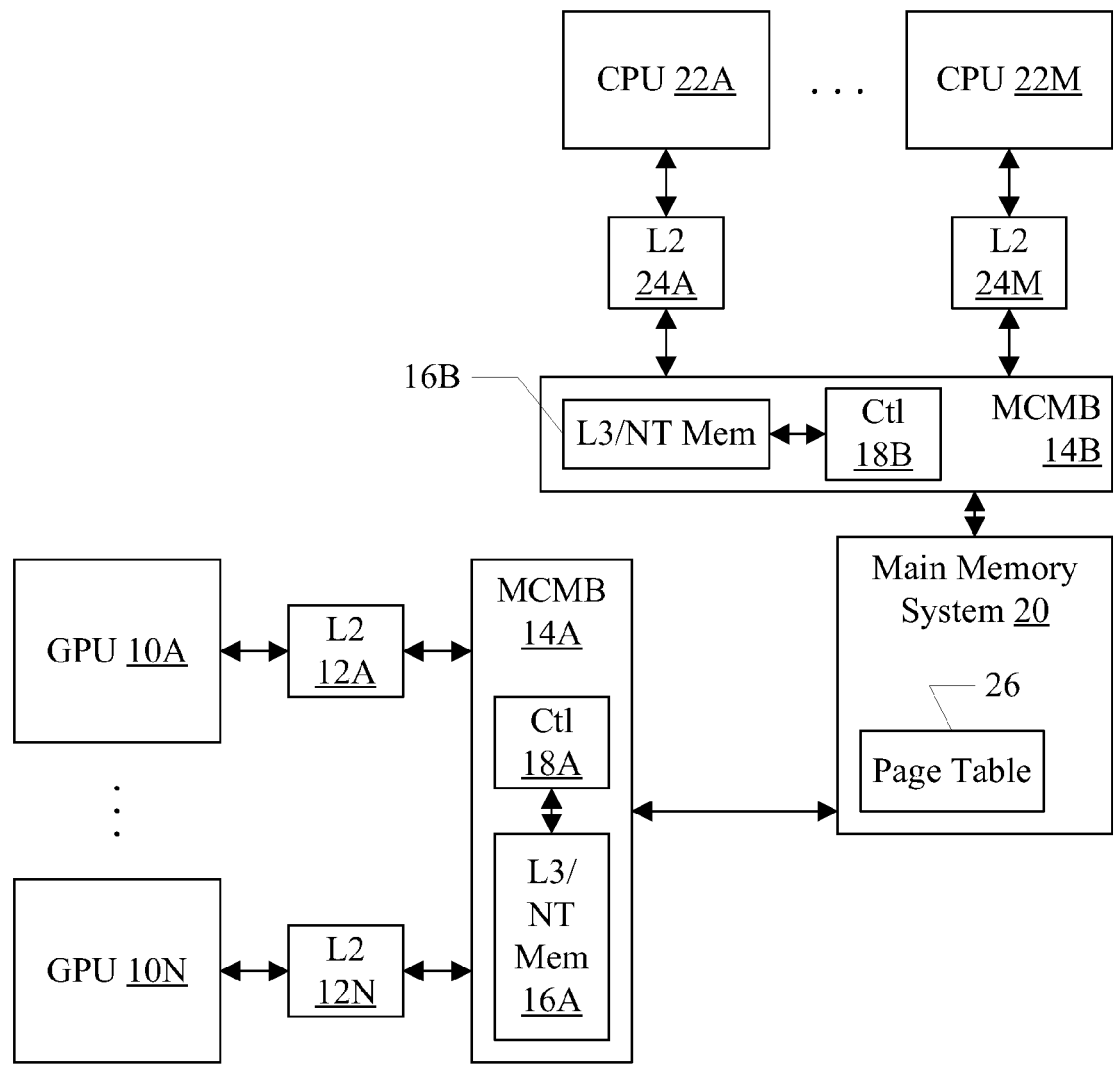
FIG. 1 is a block diagram of one embodiment of a system including one or more combined transparent/non-transparent cache.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Combined Transparent/Non-Transparent Cache Memory

In an embodiment, an integrated circuit includes an internal data memory and an associated tag memory that is configured to store a set of tags corresponding to at least a subset of the locations in the data memory. The portion of the data memory that is covered by the tags may be used as a transparent cache memory. A transparent memory may generally be managed by hardware and thus software may not directly read/write the transparent memory. If the data addressed by a software read/write (e.g. a load or store instruction) is stored in the transparent memory, the hardware will supply the data from the transparent memory (for a read) or update the data in the transparent memory (for a write). While the latency for completing the memory operation may be reduced, the software may not have any other indication that the memory operation was completed in the transparent memory (as opposed to completion in an external main memory system). Viewed in another way, the transparent memory may not be separately mapped to memory addresses in the memory address space, but rather may store copies of data from external memory, where the external memory locations are mapped to the associated memory addresses. The transparent memory may temporarily be mapped to the addresses of the data stored in the transparent memory (e.g. via the tag memory), but a corresponding main memory location is always mapped to each address as well. The hardware will also ensure coherency of the data (if coherency is implemented) and update the corresponding main memory copy if the data is modified in the transparent memory and is removed from the transparent memory by hardware.

The remainder of the data memory that is not covered by the tags may be used as a non-transparent memory. Software may map the non-transparent memory to a portion of the memory address space. For example, there may be no main memory locations associated with the portion of the memory address space that is mapped to the non-transparent memory. Alternatively, if there are main memory locations associated with the portion of the memory address space that is mapped to the non-transparent memory, the locations will not be accessed by requests generated by requestors that are coupled to the non-transparent memory. Accordingly, software may directly read/write the non-transparent memory using load/store instructions addressed to the addresses in the portion of the memory address space that is mapped to the non-transparent memory. In an embodiment, software may manage the contents of the non-transparent memory. For example, software may initialize the contents of the non-transparent memory with store instructions or by programming a direct memory access (DMA) unit to transfer data into the non-transparent memory from another source. Software may similarly read the contents and write them to some other location (or use a DMA transfer) to move data out of the non-transparent memory. In another embodiment described in more detail below for the block-based non-transparent memory, the non-transparent memory may have associated hardware to automatically move the data into or out of the non-transparent memory responsive to block requests from software.

In an embodiment, the size of the transparent memory may be programmable. Thus, the amount of the data memory that is allocated to the transparent memory may be changed to optimize the transparent memory for the workload being experienced in the integrated circuit. For example, for a given size of the data set operated upon by the workload (its "memory footprint") and for a given pattern of accesses to the data during operation, increasing the transparent memory above a certain size does not generally lead to significant increases in performance. The hit rate at the certain size for accesses to the data set may reach a high enough percentage that further size increases only increase the hit rate by small amounts. Accordingly, by programming the size of the transparent portion, the amount of data memory dedicated to transparent memory may be optimized and the remainder of the memory may be used as non-transparent memory.

In an embodiment, the tag memory may have capacity for tags to cover only a portion of the data memory, even if the transparent memory is programmed to its maximum size. Tag memory may frequently occupy more space per bit of storage than a data memory, and thus limiting the tags to a portion of the data memory may limit the size of the overall transparent/non-transparent memory. Thus, efficient use of semiconductor area may be achieved, in some embodiments. Alternatively, the tag memory may have the capacity for tags for each cache block of the data memory. Such embodiments may permit the entire data memory to be allocated to transparent memory. In such embodiments, the tag memory corresponding to the non-transparent portion of the data memory may be used to store state information for the corresponding block, the memory address to which the corresponding block is mapped, etc. In yet another alternative, a separate tag table may be implemented to store address and state information corresponding to blocks in the non-transparent memory, as desired.

The data memory, while having portions allocated to transparent and non-transparent memory, may still be a single memory array, with a single decoder that decodes addresses to access the array. Based on the allocation to transparent and non-transparent, the decoder may modify its decode of the addresses to ensure that transparent accesses are decoded into the transparent portion. The non-transparent portion may be managed by software such that a non-transparent access uses an address that naturally decodes to the non-transparent portion. Alternatively, the decoder may be configured to decode the addresses of non-transparent accesses into the non-transparent portion. Using a single memory may also be efficient in terms of space, while providing the desired transparent and non-transparent functionality.

In some embodiments, there may be certain types of workload that software may be better at handling in the non-transparent memory than the hardware may handle in the transparent memory. For example, the hardware may retain recently accessed data in the transparent memory. Processing of a data set that does not involve much re-access of previously accessed data may not benefit from transparent memory, but software may be able to manage non-transparent on-chip memory efficiently to provide lower latency access to the data (on average). Even for data that is frequently re-accessed, non-transparent memory may sometimes be more efficient and/or provide better performance than transparent memory. For example, flushing an address range from a transparent cache without affecting/interfering with other cache operation may be challenging, while an address range may be flushed via hardware in the non-transparent memory, in one embodiment. In another example, the replacement policy implemented in the cache may not suit a particular workload, and permitting software to control allocation and eviction from the non-transparent memory may match the storage of data in the non-transparent memory and the workload. Other access patterns that involve greater re-access of the data may benefit from the transparent memory.

Turning now to FIG. 1, a block diagram of one embodiment of a system including one or more combined transparent/non-transparent on-chip memories is shown. In the embodiment of FIG. 1, the system includes one or more graphics processing units (GPUs) 10A-10N, corresponding level 2 (L2) caches 12A-12N, and a multi-core management block (MCMB) 14A. The MCMB 14A includes a shared cache memory 16A, part of which may be a level 3 (L3) transparent cache memory and part of which may be a non-transparent memory. The MCMB 14A also includes a control unit 18A coupled to the shared memory 16A. The MCMB 14A is coupled to the L2 caches 12A-12N, which are coupled to respective GPUs 10A-10N. The MCMB 14A is also coupled to a main memory system 20. The system further includes one or more central processing units (CPUs) 22A-22M, corresponding level 2 (L2) caches 24A-24M, and a multi-core management block (MCMB) 14B. The MCMB 14B includes a shared cache memory 16B, part of which may be a level 3 (L3) transparent cache memory and part of which may be a non-transparent memory. The MCMB 14B also includes a control unit 18B coupled to the shared memory 16B. The MCMB 14B is coupled to the L2 caches 24A-24M, which are coupled to respective CPUs 22A-22M. The MCMB 14B is also coupled to a main memory system 20. Components referred to herein by a reference numeral followed by a letter may be similar (but not necessarily identical) to other components having the same reference numeral and a different letter. The components having the same reference numeral and different letters may be collectively referred to by the reference numeral alone (e.g. the GPUs 10A-10N may be referred to collectively as GPUs 10).

In general, the shared cache memories 16 may each be coupled to receive memory requests from one or more request sources. For example, in FIG. 1, the GPUs 10 may be request sources for the memory 16A and the CPUs 22 may be request sources for the memory 16B. As illustrated in FIG. 1, the memory requests may pass through other components (e.g. the L2 caches 12 and 24 in FIG. 1, respectively) to reach the shared memory, and if the memory requests hit in the L2 caches 12 or 24, they may not reach the shared memory. The GPUs 10 and CPUs 22 may be configured to generate memory requests in response to executing load/store instructions, in response to instruction fetches, and in response to ancillary support operations such as address translations. While processors are used as request sources in this embodiment, any circuitry that may generate memory requests may be used.

The memory requests may include a non-transparent attribute identifying the request as either non-transparent or transparent. For example, the non-transparent attribute may be a bit indicating non-transparent when set and transparent when clear. The opposite meanings of the set and clear states of the bit may be used in other embodiments, and other attribute encodings may be used.

If a memory request is indicated as non-transparent, the cache memory 16 may be configured to decode the address into the non-transparent portion of the memory. The data stored at the identified location may be provided in response to the memory request (if the request is a read) or updated in response to the memory request (if the request is a write). That is, the address of the memory request may directly address the memory, without performing any tag comparison or other qualification of the address. Transparent memory requests, on the other hand, may be decoded to address the transparent portion of the memory. Data from the location or locations may be provided/updated only if a tag match is detected and the cache block is valid in the cache. Detecting a valid tag match may be referred to as a cache hit (the addressed data is stored in the cache). Not detecting a valid tag match may be referred to as a cache miss (the addressed data is not stored in the cache). The control unit 18 may be configured to initiate a cache fill to copy the addressed data into the cache in response to a cache miss. A location in the cache may be selected to store the missing cache block, and if a valid, modified (dirty) cache block is stored in the selected location, the control unit 18 may be configured to write the modified cache block back to the main memory system 20. On the other hand, there is no concept of a miss in the non-transparent portion of the memory and thus there may be no cache fill initiated for the non-transparent portions by the control unit 18.

The non-transparent attribute may be determined in a variety of fashions. In one embodiment, the non-transparent attribute may be included in the page table entry used to translate a virtual address to a physical address that is used to access memory. For example, the page tables 26 stored in the main memory system 20 may include page table entries that include the non-transparent attribute for each page translated by the page tables. Software that controls the virtual address translations may assign the non-transparent attribute to each page. The software may be executed on the CPUs 22A-22M, the GPUs 10A-10N, or both. In an embodiment, software may assign a non-transparent address range within the memory address space used to access the main memory system 20, and the non-transparent address range may be mapped to the non-transparent portion of the memory 16. Translations to pages in the non-transparent address range may have the non-transparent attribute indicating non-transparent, and other pages may have the non-transparent attribute indicating transparent. Other embodiments may use other mechanisms to determine the non-transparent attribute. For example, the non-transparent address range may be programmed into one or registers accessible in the memory request path (e.g. in a memory management unit in the GPUs 10 or 22; in an address generation unit in the processors 10 or 22; in the memory 16 or its control unit 18; etc.). Other embodiments may specify the non-transparent attribute as an operand of the instruction, via a specific instruction encoding, etc.

The GPUs 10A-10N may implement an instruction set architecture that is optimized for graphics manipulations (e.g. rendering images into a frame buffer, pixel manipulations, etc.). The GPUs 10A-10N may implement any microarchitecture, including scalar, superscalar, pipelined, superpipelined, out of order, in order, speculative, non-speculative, etc., or combinations thereof. The GPUs 10A-10N may include circuitry, and optionally may implement microcoding techniques. Similarly, the CPUs 22A-22M may implement an general purpose instruction set architecture and may implement any microarchitecture, including any of the above possibilities. The GPUs and CPUs may be examples or processors, which may be any circuitry configured to execute instructions. A processor may be a discrete integrated circuit, a core integrated onto an integrated circuit, etc. For example, in FIG. 1, the GPUs 10, L2 caches 12, and MCMB 14A may be integrated onto a graphics chip and the CPUs 22, L2 caches 24, and MCMB 14B may be integrated onto a multi-core CPU chip. In another embodiment, the GPUs 10, CPUs 22, L2 caches 12 and 24, and MCMBs 14 may be integrated into an integrated circuit. In some embodiments, the integrated circuit may also include other components integrated with the GPUs/CPUs and related circuitry.

The GPUs 10 and CPUs 22 may include L1 caches (not shown), and thus the caches 12 and 24 are L2 caches in this embodiment. The L2 caches may have any size and configuration (e.g. set associative, direct mapped, etc.). The L2 caches may also implement any cache block size (e.g. 32 bytes or 64 bytes, or larger or smaller). The cache block size may be the unit of allocation and deallocation in the cache.

In addition to including the combined cache memories 16, the MCMBs 14 may generally provide interconnect between the corresponding processors the main memory system 20. If cache coherency is implemented, the MCMBs 14 may be responsible for issuing probes (e.g. a request from one processor may result in a probe to the other processors to obtain any modified data in the other processor's L1 or L2 caches, invalidating cached copies for any update request, etc.). The MCMBs may communicate with each other and/or with a memory controller in the main memory system 20. In one embodiment, the memory controller may be implemented on chip with the MCMBs 14, and/or may be part of one of the MCMBs 14.

The main memory system 20 may include any type of memory. For example, the memory may comprise dynamic random access memory (DRAM), synchronous DRAM (SDRAM), double data rate (DDR, DDR2, DDR3, etc.) SDRAM (including mobile versions of the SDRAMs such as mDDR3), RAMBUS DRAM (RDRAM), static RAM (SRAM), etc.

Other embodiments of the system of FIG. 1 may include only one shared cache memory (e.g. either the memory 16A/control unit 18A or the memory 16B/control unit 18B). Still other embodiments may have a shared memory accessible to both the CPUs 22A-22M and the GPUs 10A-10N, which may be similar to the memory 16/control unit 18 as described above.

It is noted that the number of each component in various embodiments may vary. For example, one or more GPUs 10A-10N may be provided, and one or more CPUs 22A-22M is provided. In other embodiments, there may be no GPUs and/or no CPUs. As indicated by 10N and 22M, the number of one processor may differ from the number of the other processor. L2 caches 12 and 24 are shown in FIG. 1 to be associated with respective processors, but may be shared by subsets of the processors in other embodiments. In still other embodiments, there may be no L2 caches.

Figure 2:
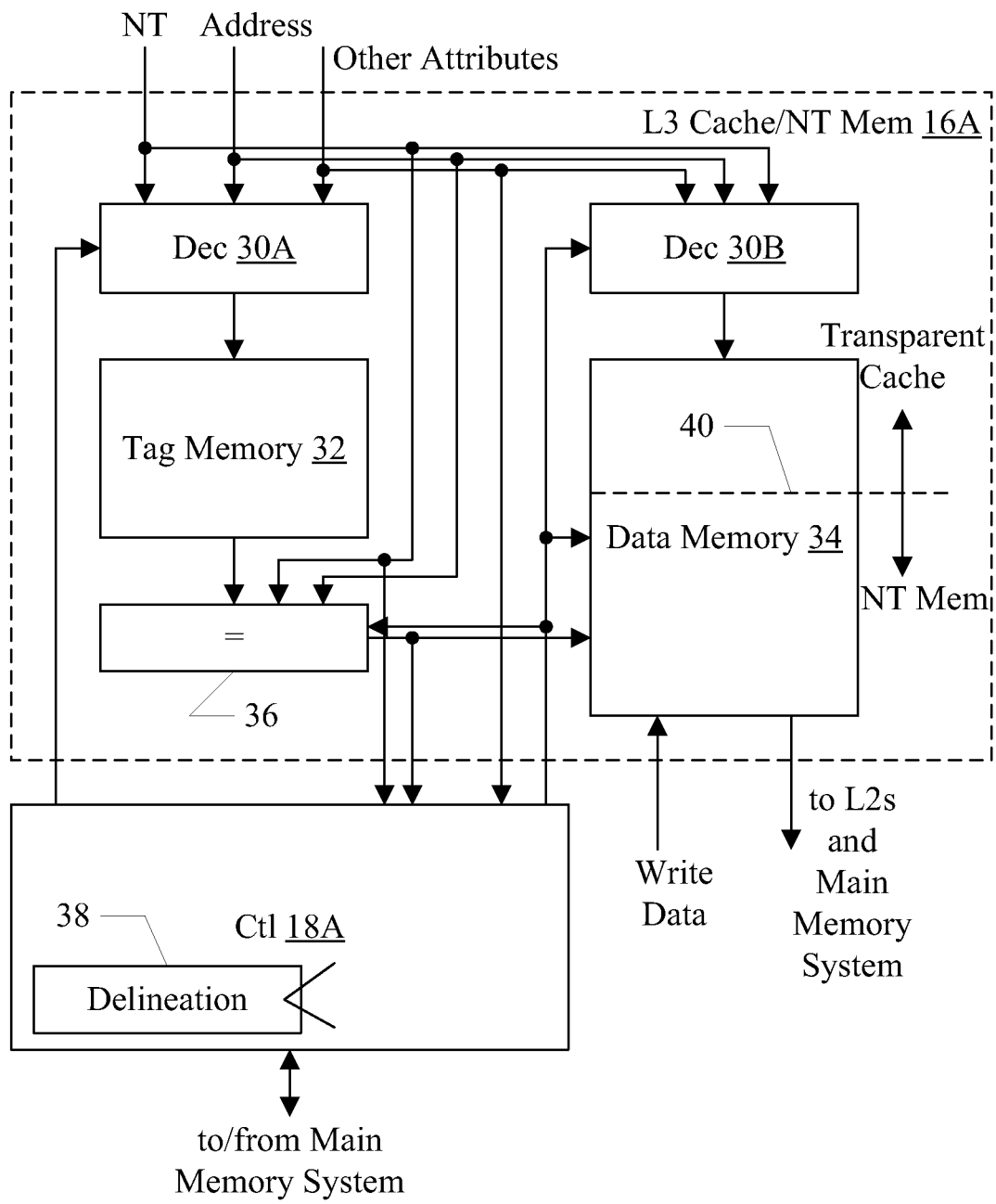
FIG. 2 is a block diagram of one embodiment of a combined transparent/non-transparent cache.

Turning now to FIG. 2, a block diagram of one embodiment of the memory 16A and control unit 18A is shown. The memory 16B and control unit 18B may be similar. In the illustrated embodiment, the memory 16A includes decoders 30A-30B, a tag memory 32, a data memory 34, and a comparator 36. The control unit 18A includes a delineation register 38. The decoders 30A-30B are coupled to receive an address of a memory request (Address in FIG. 2), the non-transparent attribute of the request (NT in FIG. 2), and other attributes of the request (Other Attributes in FIG. 2). The control unit 18A is coupled to receive the non-transparent attribute and may also receive the other attributes, or some of the other attributes, in various embodiments. The comparator is coupled to receive the non-transparent attribute, the other attributes (or at least some of the other attributes), and the address (or at least the portion of the address that is compared to the tags from the tag memory 32). The decoder 30A is coupled to the tag memory 32 and the control unit 18A, and the decoder 30B is coupled to the data memory 34 and the control unit 18A. The data memory 34 is coupled to the control unit 18A, to provide read data output to the L2 caches and main memory system, and to receive write data from the L2 caches. The tag memory 32 is coupled to the comparator 36, which is coupled to the data memory 34 and the control unit 18A.

The decoders 30A-30B may be configured to decode the address of the memory request to select a memory location in the tag memory 32 and the data memory 34 to be accessed, respectively. The location in the tag memory 32 may store one or more tags to be compared to the tag portion of the address for a transparent memory request. The number of tags stored in the location may depend on the configuration of the transparent cache. For example, if the transparent cache is direct mapped, one tag may be stored. If the transparent cache is N-way set associative, N tags may be stored. The tags may be output by the tag memory 32 to the comparator 36, along with various state such as a valid bit. The comparator 36 may compare the tags to the tag portion of the address, and signal a hit or miss to the data memory 34 and the control unit 18A. If the cache is N-way set associative, the comparator 36 may also identify the hitting way. The data memory 34 may output data from the hitting way (or may write the write data to the hitting way, for a write). The tag portion of the address may be the portion of the address that excludes bits identifying the offset of the memory request within a cache block and also exclude the index bits that are decoded by the decoders 30A-30B to select locations.

The comparator 36 may receive the non-transparent attribute, and may be configured to inhibit signaling a hit for non-transparent memory accesses. Instead, the data memory 34 may access the identified location in the non-transparent portion of the data memory 34 in response to a non-transparent memory request. Similarly, the other attributes of the memory request may also affect the comparison. For example, the other attributes may include a non-cacheable attribute and/or a cache bypass attribute. If the memory access is non-cacheable or the cache is bypassed, the comparator 36 may inhibit asserting hit for the access as well. The control unit 18A may interface with other circuitry in the MCMB 14A to initiate the main memory access for the memory request (to/from main memory system in FIG. 2). Alternatively, in some embodiments, tags may be maintained for the non-coherent portion and comparators 36 may make the comparison.

The decoder 30B may similarly be configured to decode the address and select a location to be accessed. As illustrated in FIG. 2 by the horizontal dashed line 40, the data memory 34 may be divided into a transparent cache portion (above the dashed line 40 in FIG. 2) and a non-transparent memory portion (below the dashed line 40 in FIG. 2). Accordingly, non-transparent memory addresses may decode to locations in the non-transparent portion and transparent memory addresses may decode to locations in the transparent portion. In one embodiment, for example, the transparent portion of the data memory 34 may be mapped to the lowest numerical values of the index. In such an embodiment, the decoder 30B may mask address bits of the index outside of the range that is mapped to the transparent portion for transparent memory requests, ensuring that any transparent memory request address decodes to the transparent portion. That is, if the non-transparent attribute indicates transparent, the decoder 30B may mask the more significant bits of the index to zero, forcing the index to decode into the transparent portion. Non-transparent memory request addresses may not be masked, and may thus decode into the non-transparent portion. In one embodiment, software may control the allocation of the non-transparent memory address range so that any address in the range has non-zero address bits in the portion of the index that is masked for transparent memory requests (and thus non-transparent memory request addresses decode into the non-transparent portion without any specific logic in the decoder 30B other than normal address decoding).

For example, the data memory 24 may include 4096 addressable memory locations, and thus the index for the data memory may include 12 address bits. If 256 of the memory locations are allocated to the transparent cache, the least significant 8 address bits may be decoded for a transparent memory request (the most significant 4 bits may be masked) and the non-transparent memory address range may include non-zero bits in the 4 most significant bits of the index. Other embodiments may map transparent and non-transparent addresses to data memory locations in other ways.

In one embodiment, the size of the transparent cache is programmable in the delineation register 38. In such an embodiment, the control unit 18A may provide masking controls to the decoders 30A-30B to mask additional address bits for the programmed size of the cache. Continuing with the above example, if the transparent cache is programmed to ½ size (128 memory locations), then one additional most significant bit (i.e. the 5th most significant bit) is masked. The decoder 30A may also mask the index in this case, to reduce the tag access to match the programmed size of the cache. The programmed delineation may also increase the size of the non-transparent memory, since the portion not being used for the transparent cache memory may be used for the non-transparent memory.

Other embodiments may use different decoder 30A-30B configurations. For example, the non-transparent memory range may be freely allocated to any base address, and the decoder 30B may decode the range into the non-transparent portion of the data memory by decoding the base address to the first location in the non-transparent portion, decoding the base address plus the size of the first location to the second location, etc. Another embodiment may also use different schemes of mapping the transparent cache and non-transparent memory to locations in the data memory 34.

In some embodiments, the data memory 34 may be banked. For example, a 64 byte cache block may be stored across eight 8 byte banks in the data memory 34. In such an embodiment, the non-transparent memory may have a finer granularity than the cache block. For example, a non-transparent memory access may be bank sized, such as 8 bytes in the above example.

As illustrated in FIG. 2, the data memory 34 may be a single memory array managed by a single decoder. That is, the decoder may decode addresses to generate a set of word lines, each word line selecting a different location in the memory array forming the data memory 34. Some of the locations may be cache block storage locations for the transparent cache memory, and other locations may be the non-transparent memory locations.

In another embodiment, the non-transparent portion of the memory may also be tagged. Such embodiments may permit multiple address ranges to be assigned as non-transparent addresses. However, in such embodiments, the tag memory for the non-transparent memory may be readable and writeable by software so that software may manage the contents of the non-transparent portion.

It is noted that, while FIG. 2 illustrates one address input to the memory 16A, other embodiments may support more than one address in parallel in a multiported configuration. Decoders similar to 30A-30B may be included for each port.

Figure 3:
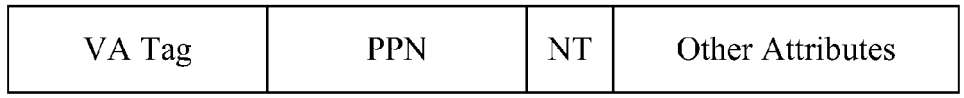
FIG. 3 is a block diagram of one embodiment of a page table entry including a non-transparent attribute.

Turning now to FIG. 3, a block diagram of one embodiment of a page table entry 50 that may be stored in the page table 26 is shown. The page table entry 50 may be used as part of any address translation mechanism. In some embodiments, multiple page table accesses in a hierarchical fashion may be used to map a virtual address to a physical address. In such embodiments, the virtual address tag (VA Tag) may not be needed. In other embodiments, a portion of the virtual address that is not used to look up the page table entry may be matched against the virtual address tag field of the entry 50. A physical page number (PPN) field may store the page portion of the physical address (which may be concatenated with the offset portion of the virtual address to form the physical address). Any page size may be supported (e.g. 4 kilobytes, 8 kilobytes, or larger such as 1-4 Megabytes, or even larger). In some embodiments, more than one page size may be supported. The page table entry 50 also includes the non-transparent attribute (NT), and may include other attributes (Other Attributes field). The other attributes may include, for example, cacheability, writethrough or writeback, privilege level requirements, a valid bit, read/write permissions, etc.

Accordingly, using page table entries such as entry 50, software may allocate a range of physical addresses as non-transparent using the NT attribute. Other pages outside of the range may have the NT attribute indicating transparent.

Figure 4:
FIG. 4 is a block diagram of a programmable register defining a non-transparent address range.

FIG. 4 is a block diagram of an embodiment of a register 52 that may be programmed with a non-transparent address range. The address range may be expressed in any fashion. For example, as shown in FIG. 4, the address range may be represented as a base address and a limit. The range may also be represented as a base address and a size, or may be represented in any other fashion that defines the range. A register such as register 52 may be used at any point in an address generation and translation (if applicable) for a memory request to determine the non-transparent attribute of the memory request. For example, a memory management unit (MMU) in a processor may include the register 52, and translated addresses may be compared to the base and limit fields to determine if the address is in the non-transparent address range or outside of the non-transparent address range. More than one address range may be defined, in some embodiments, by including more than one register 52.

Figure 5:
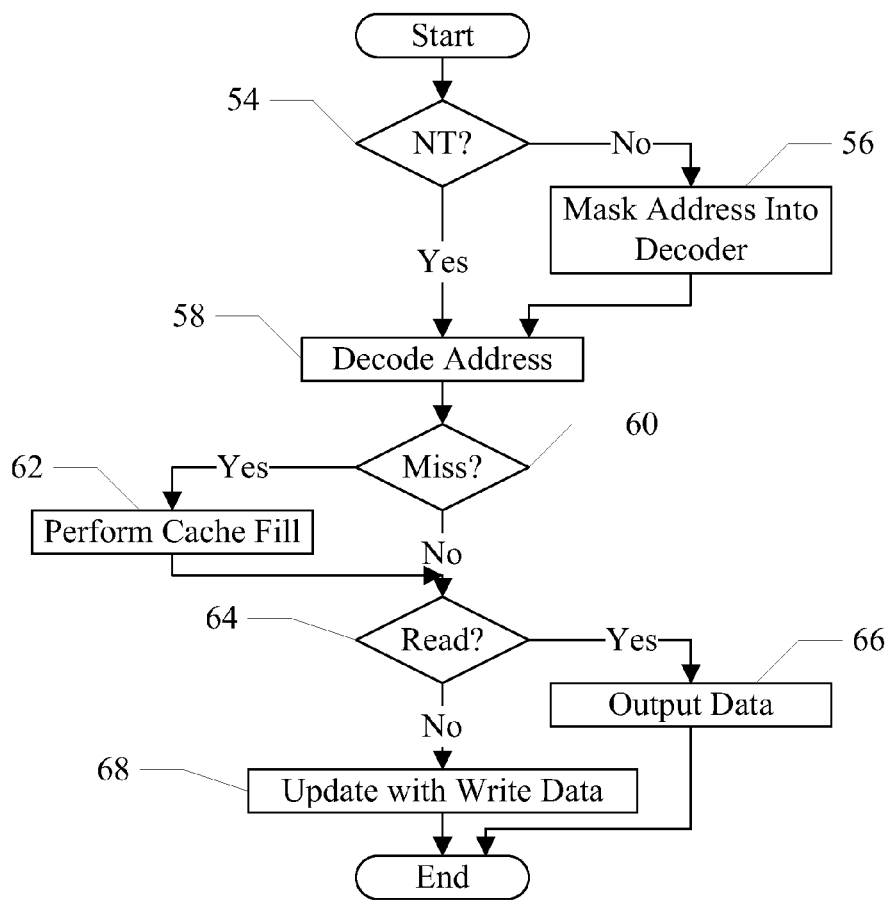
FIG. 5 is a flowchart illustrating operation of one embodiment of a combined transparent/non-transparent memory in response to a memory request.

Turning next to FIG. 5, a flowchart is shown illustrating operation of one embodiment of the memory 16A/control unit 18A in response to a memory request presented to the memory 16A/control unit 18A. While the blocks are shown in a particular order for ease of understanding, other orders may be used. Blocks may also be performed in parallel by combinatorial logic within the control unit 18A. Blocks, combinations of blocks, and/or the flowchart as a whole may be pipelined over multiple clock cycles.

If the non-transparent attribute of the request indicates transparent (decision block 54, "no" leg), the decoders 30A-30B may be configured to mask the address of the memory request to ensure that the address decodes into the transparent portion of the data memory 34 (block 56). If the non-transparent attribute indicates non-transparent (decision block 54, "yes" leg), no masking may occur. In either case, the decoders 30A-30B may be configured to decode the address (block 58) and select memory locations in the tag memory 32 and the data memory 34. If the memory request is transparent and is a miss in the transparent portion of the memory 16A (decision block 60, "yes" leg), the control unit 18A may be configured to generate a cache fill to obtain the missing cache block (block 62). The control unit 18A may be configured to select a block to evict from the cache, and if the evicted block is modified, the control unit 18A may be configured to write the cache block back to the main memory system 20. If the memory request is a hit or is non-transparent (decision block 60, "no" leg), the memory location in the data memory 34 may be accessed.

If the memory request is a read (decision block 64, "yes" leg), the memory 16A may output data from the accessed location in the data memory 34 (block 66). Otherwise, the memory request is a write (decision block 64, "no" leg) and the memory 16A may update the accessed location with the write data (block 68).

Figure 6:
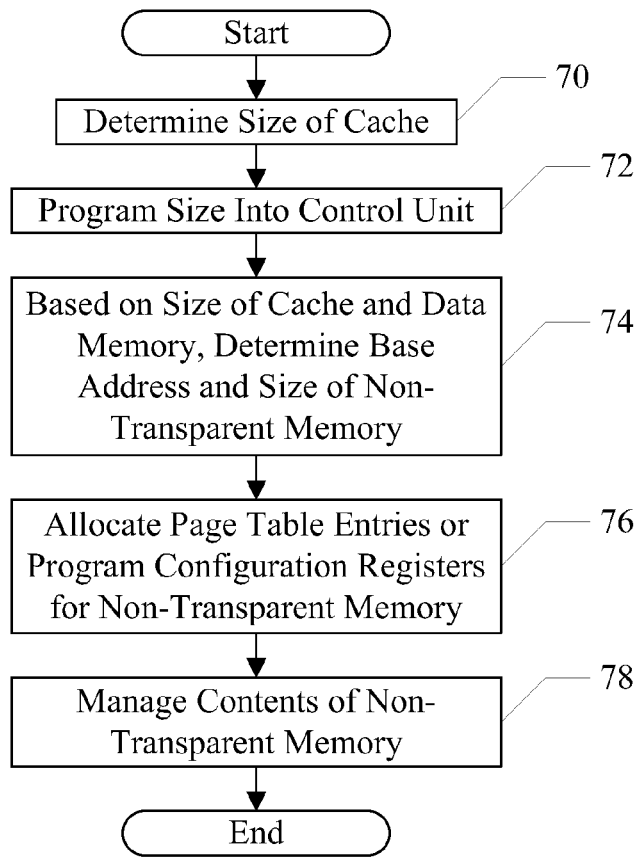
FIG. 6 is a flowchart illustrating operation of one embodiment of code that may make use of the non-transparent portion of the combined transparent/non-transparent memory.

Turning next to FIG. 6, a flowchart is shown illustrating operation of one embodiment of control code that may be executed by one or both of the CPUs 22 or the GPUs 10 to control the memory 16A. Similar operation may be performed for the memory 16B. The control code may comprise instructions which, when executed, may cause the system to implement the operation illustrated in FIG. 6. While the blocks are shown in a particular order in FIG. 6, other orders may be used.

The code may determine the desired size of the transparent cache portion of the memory 16A (block 70). The desired size may be the maximum size, or less than the maximum size. Various factors may affect the determination. For example, the workload that is to be executed may affect the size. If the workload will benefit from a larger cache size (e.g. because the expected hit rate will go up), a larger cache size may be selected. If the workload will not benefit from a large cache (e.g. there is not much reuse of the data as the workload executes), then a smaller cache size may be used. The code may program the size into the control unit 18A (e.g. in the delineation register 38—block 72).

Dependent on the selected transparent cache size and size of the data memory 34, the code may determine a base address and size of the non-transparent memory (block 74). For example, if a cache size of 1 Megabyte is selected, the base address of the non-transparent memory range may be on a 1 Megabyte boundary. The size of the non-transparent memory may be the data memory size less the size of the transparent cache (e.g. if the data memory is 8 Megabytes and the cache size is 1 Megabyte, the non-transparent memory is 7 Megabytes beginning at a 1 Megabyte boundary). The code may program the configuration registers or page table entries to identify the non-transparent memory, depending on the embodiment (block 76). The code may manage the contents of the non-transparent memory (block 78). For example, the code may initialize the non-transparent memory to a known value, may move data between the non-transparent memory from other memory locations or a peripheral, etc. In some embodiments, the movement of data between the non-transparent memory and other memory locations or a peripheral may be handled in hardware circuitry.

Figure 7:
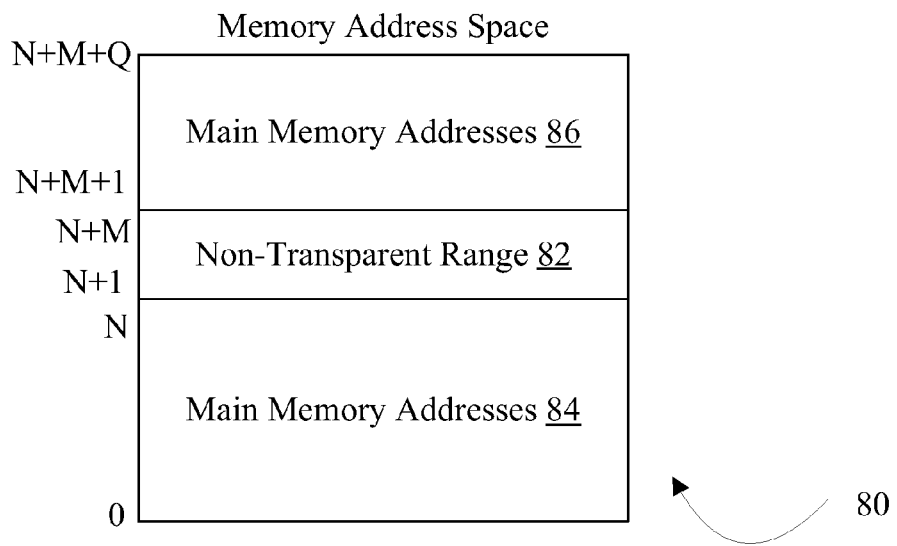
FIG. 7 is a block diagram illustrating one embodiment of a memory address space.

Turning next to FIG. 7, a block diagram of one embodiment of a memory address space 80 is shown. The memory address space may comprise a set of numerical values which are mapped to memory in the system. That is, each numerical value within the memory address space 80 uniquely identifies a specific storage location in the memory of the system. In some cases, a portion of the memory address space 80 may be mapped to peripheral devices (memory-mapped input/output (I/O)), but the remainder of the memory address space is mapped to memory locations. Addresses in a different address space (e.g. an I/O address space or a configuration address space) may not be comparable to the addresses in the memory address space.

As illustrated in FIG. 7, a portion of the memory address space 80 is mapped to the non-transparent portion of the memory 16A (reference numeral 82). The location of the non-transparent range 82 within the memory address space may be determined by software, and may be subject to beginning at a specific boundary based on the size of the transparent cache portion in some embodiments. Other memory addresses in the memory address space (e.g. addresses below the non-transparent range 82, illustrated at reference number 84, and addresses about the non-transparent range 82, illustrated at reference numeral 86) may be mapped to the main memory system 20. Addresses in the ranges 84 and 86 may be eligible for caching in the transparent cache portion of the memory 16A, if indicated as cacheable in the page tables or via other mechanisms for determining cacheability such a memory type region registers that may be supported in the CPUs 22 or the GPUs 10.

In FIG. 7, the numerical addresses within the memory address space 80 are illustrated on the left side of the space. Accordingly, the lower main memory address range 84 begins with address 0 and extends to address N. The address N may be any address that is a boundary of the size of the transparent cache portion of the memory 16A. The non-transparent address range thus begins with the address N+1 and extends to the address N+M (where M is the size of the non-transparent range). The upper main memory address range begins with address N+M+1 and extends to N+M+Q. Accordingly, any address between 0 and N+M+Q maps to a specific memory location in either the main memory system 20 or the non-transparent portion of the memory 16A. The address N+M+Q is either the maximum possible address in the system, or addresses larger than N+M+Q may cause a fault in the instruction that generates the address.

Block-Based Non-Transparent Memory

The non-transparent portion of the memory 16A may be sufficient to store a non-transparent data set for the GPUs 10 (that is, the data set that software desires to map to the non-transparent memory in the memory 16A). Similarly, the non-transparent memory 16B may be sufficient to store a non-transparent data set of the CPUs 22. In other embodiments, the desired non-transparent data set may exceed the size of the non-transparent memory. For such embodiments, software may need to transfer data into and out of the non-transparent memory fairly frequently. An embodiment of the control unit 18A (or 18B) is contemplated that provides assistance in performing the data movements.

Some embodiments may be implemented in the context of the embodiment of FIG. 1, in which a portion of the memory 16A is also allocated to transparent cache memory. Other embodiments, however, may be implemented in a non-transparent memory that is not shared with a transparent cache memory in the same memory array (but that is still on-chip with the request sources that generate the memory requests to the non-transparent memory).

The non-transparent memory address range may be divided into multiple non-transparent memory blocks. A non-transparent memory block is a contiguous (in the memory address space) block of non-transparent memory that may be requested by a request source (e.g. a GPU 10A-10N or CPU 22A-22M). The non-transparent memory block may be any desired size, and need not be related to the size of a cache block. For example, a non-transparent memory block may be the size of a page in the address translation mechanism implemented within the system, or may be an integer multiple of a page in size. Other embodiments may use a size smaller than a page size as well, if desired.

For simplicity in the remainder of the description, the GPUs 10A-10N will be used as an example of request sources and the non-transparent portion of the memory 16A and control unit 18A as an example of the non-transparent memory. However, other embodiments may have other request sources and non-transparent memories, including the CPUs 22A-22M and the memory 16B/control unit 16B (or a single shared memory for CPU and GPU requestor sources).

In addition to performing various reads and writes to non-transparent memory, the GPUs 10 may be configured to transmit a block request to the control unit 18A. The block request may identify a usage model for the block, and may also identify a main memory address (that is, an address that is not mapped to the non-transparent memory). The control unit 18A may be configured to allocate one of the non-transparent memory blocks in response to the block request, and may be configured to return a pointer to the block (e.g. a base address of the non-transparent memory block). Based on the usage model, the control unit 18A may automatically move data between the main memory and the allocated block. For example, the control unit 18A may automatically fill data from the main memory into the allocated block, automatically flush data from the allocated block to main memory after the GPU 10 indicates that it is finished with the allocated block, or both.

The block request may be formulated in any fashion. For example, the block request may be a store instruction to a defined address that is assigned as the block request address followed by a load instruction to the same address. The data stored by the store instruction may be the main memory address that is the source/destination of data for the allocated block and may also include an indication of the usage model described below. The block address (the base address of the assigned block) may be returned as the result of the load instruction, and thus the software executing on the GPU may have access to the block using the block address. Alternatively, a specific instruction may be defined in the GPU's instruction set architecture to transmit the block request. Any mechanism for transmitting the block request and receiving the block address may be used.

In one embodiment, there may be three possible usage models for a non-transparent memory block: static read, static write, and static read/write. Other embodiments may define any set of two or more usage models, as desired. A static read usage model includes automatically flushing the data from the allocated block to main memory when the block requestor is finished with the block. Thus, a static read block may be a block in which the block requestor intends to write each byte of the block (or the contents on unwritten bytes of the block are "don't care"). A static write usage model includes automatically filling the data from the main memory. A static read/write model includes both automatically filling and automatically flushing.

By providing the block allocation and automatic data movement, the control unit 18A may relieve the software executing on the GPUs from the data movement tasks. In some cases, performance may be improved since the software need not move the data using load/store instructions.

Figure 8:
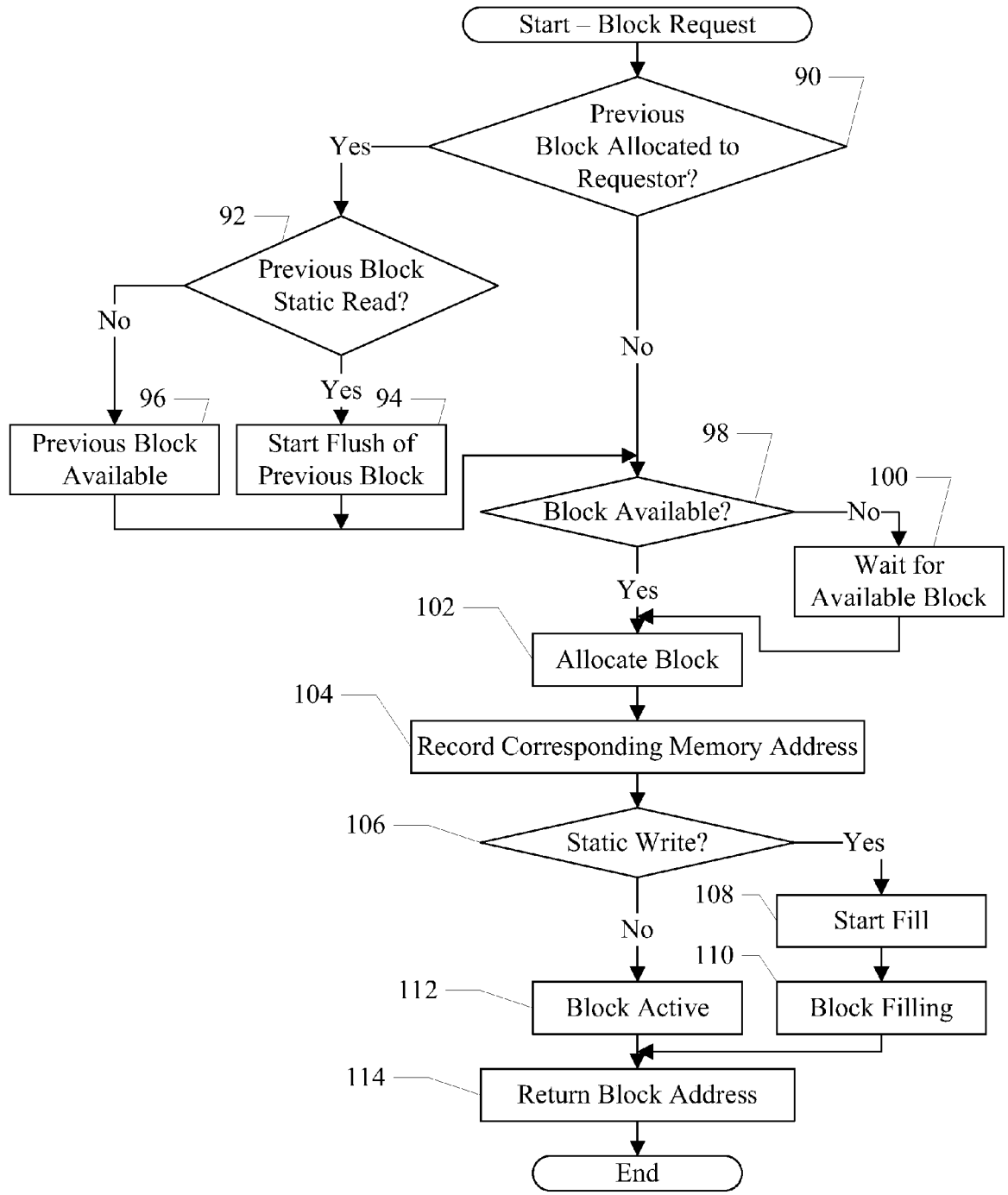
FIG. 8 is a flowchart illustrating operation of one embodiment of a block-based non-transparent cache in response to a block request.

Turning now to FIG. 8, a flowchart is shown illustrating operation of one embodiment of the control unit 18A in response to a block request for a non-transparent memory block. While the blocks are shown in a particular order for ease of understanding, other orders may be used. Blocks may be performed in parallel in combinatorial logic in the control unit 18A. Blocks, combinations of blocks, and/or the flowchart as a whole may be pipelined over multiple clock cycles.

In one embodiment, a block request for a given requestor may also be an indication that the requestor is finished with a previously allocated non-transparent memory block. If a previous non-transparent memory block was allocated to the requestor (decision block 90, "yes" leg), and the previous non-transparent memory block was a static read type (decision block 92, "yes" leg), the control unit 18A may be configured to start the flush of the previous non-transparent memory block (block 94). The control unit 18A may be configured to change the state of the non-transparent memory block to flushing. The previous non-transparent memory block may have the static read type if the usage model was indicated as static read or static read/write when the previous non-transparent memory block was requested. If the previous non-transparent memory block is not the static read type, the control unit 18A may be configured to change the state of the non-transparent memory block to available (block 96).

In other embodiments, an explicit block complete command may be supported, and the requestor may transmit the block complete command to the control unit 18A. The control unit 18A may be configured to perform the same processing illustrated via blocks 92, 94, and 96 in response to the block complete command.

The control unit 18A may be configured to determine if a non-transparent memory block is available for allocation in response to the block request (decision block 98). If not (decision block 98, "no" leg), the control unit 18A may wait for a non-transparent memory block to become available (block 100). Alternatively, the control unit 18A may be configured to return a "no block available" response to the block request if a non-transparent memory block is not available for allocation. The "no block available" response may be a zero block address, or may be indicated in the least significant bits of the block address which would be an offset within the block. If a non-transparent memory block is available or becomes available after the wait, the control unit 18A may be configured to allocate the non-transparent memory block (block 102). The control unit 18A may also be configured to record the corresponding main memory address supplied in the block request, and may associate the corresponding main memory address with the allocated block (block 104).

If the block request includes a static write type (e.g. the usage model is static write or static read/write—decision block 106, "yes" leg), the control unit 18A may be configured to initiate a fill of the allocated block from the corresponding main memory address (block 108). The control unit 18A may be configured to change the state of the allocated block to filling (block 110). If the block request does not include a static write type (decision block 106, "no" leg), the control unit 18A may be configured to change the state of the block to active (block 112). In either case, the control unit 18A may be configured to return the block address of the allocated block to the requestor (block 114).

Figure 9:
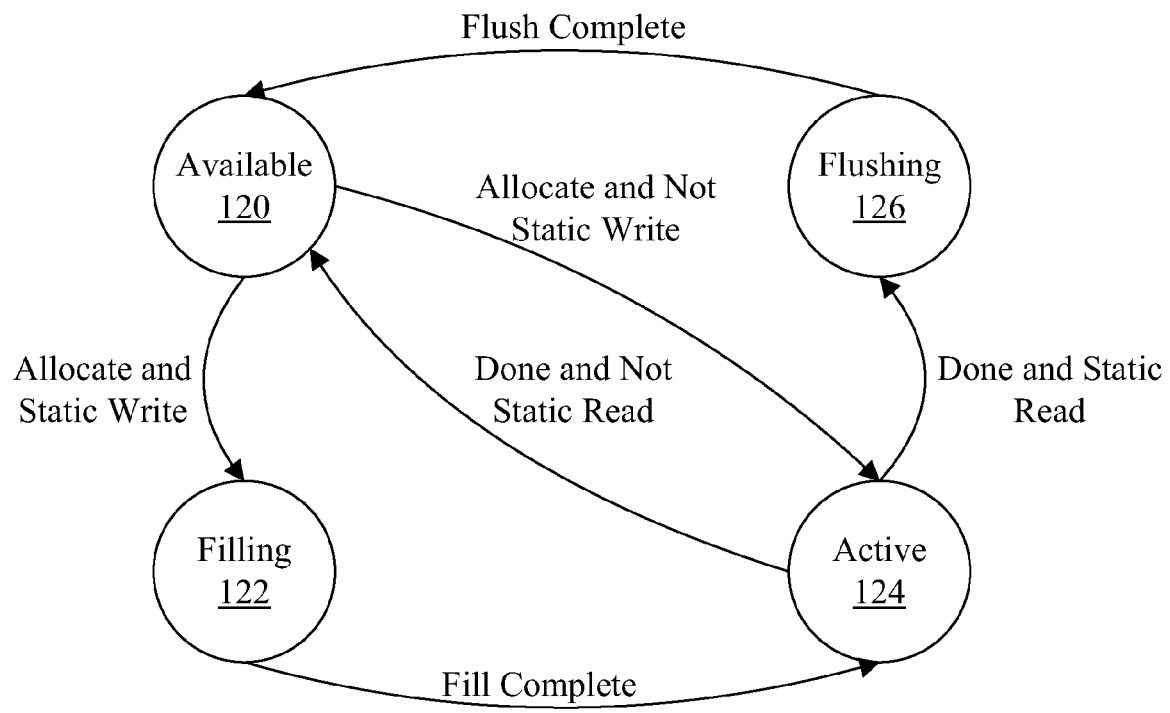
FIG. 9 is a block diagram illustrating various states of each block in one embodiment of the block-based non-transparent cache and transitions between the states.

Turning now to FIG. 9, a block diagram illustrating a state machine that may be implemented by one embodiment of the control unit 18A for a non-transparent memory block is shown. The state machine of FIG. 9 may be implemented for each non-transparent memory block in parallel. The state machine includes an available state 130, a filling state 122, an active state 124, and a flushing state 126. Some of the transitions illustrated in FIG. 9 were also mentioned above with regard to FIG. 8.

If the non-transparent memory block is in the available state 120, it is available to be allocated in response to a block request from a requestor. If the control unit 18A allocates the block for a block request having a static write type (e.g. static write or static read/write usage models), the control unit 18A may be configured to change the state of the block from the available state 120 to the filling state 122. In one embodiment, the control unit 18A may be configured to stall or reject read memory requests to the block while the block is in the filling state 122 (since data is still being written to the block by the control unit 18A, moving data in from the corresponding main memory address supplied by the requestor). In the filling state 122, the control unit 18A may be configured to read the corresponding main memory address (and addresses contiguous to the corresponding main memory address) and to write the data to the allocated block. Once the fill is complete, the control unit 18A may be configured to change the state of the block from the filling state 122 to the active state 124. On the other hand, if the control unit 18A allocates the block in response to a block request that does not have the static write type, the control unit 18A may change the state of the block from the available state to the active state 124.

In the active state 124, the non-transparent memory block is allocated to the requestor and the requestor may access the non-transparent memory block as desired. Once the requestor has completed processing of the data in the non-transparent memory block, the requestor may indicate that it is finished with the block (e.g. by requesting another block or using the explicit block complete command as described above). If the requestor is done with the block and it is not a static read type (e.g. static read or static read/write usage model), the control unit 18A may change the state of the block from the active state 124 to the available state 120. If the block is the static read type, the control unit 18A may be configured to change the state of the block from the active state 124 to the flushing state 126. In the flushing state 126, the control unit 18A may be configured to write the data from the block to the corresponding main memory address. When the flush is completed, the control unit 18A may be configured to change the state of the block from the flushing state 126 to the available state 120.

Figure 10:
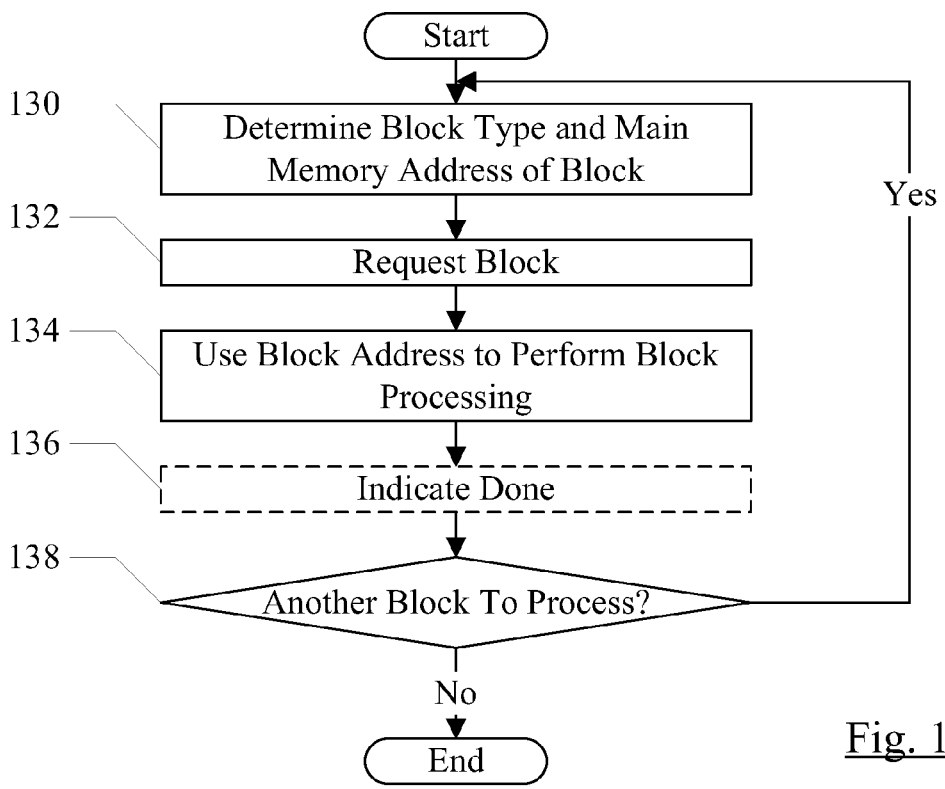
FIG. 10 is a flowchart illustrating operation of one embodiment of code that may request a non-transparent memory block and process data in the block.

Turning next FIG. 10, a flowchart is shown illustrating operation of one embodiment of code executing on the GPUs 10 to process data using the non-transparent memory blocks. The code may include instructions which, when executed, cause the system of FIG. 1 to implement the operation illustrated in FIG. 10. While the blocks are shown in a particular order for ease of understanding, other orders may be used.

The code may determine the block type and the main memory address of the block to be processed (block 130). The block type may be based on the processing that the code is to do on the block. For example, if the code is going to create new data to write to the block, the usage model may be static read. If the code is going to read data from the block but not write it, the usage model may be static write. If the code is going to read data from the block and write the data, the usage model may be static read/write. The main memory address may be determined based on the location of the data to be processed. For example, the GPUs 10 may be processing tiles of an image in a frame buffer in the main memory system. The tiles may be subsections of the overall image. The GPU may select the next tile to be processed, and the main memory address may be the address of the selected tile.

The code may request a non-transparent memory block (block 132) and may use the block address to perform processing in the non-transparent memory block (block 134). Optionally, in embodiments that include an explicit block complete command, the code may transmit the block complete command (block 136). If there are additional blocks to be processed in the main memory (decision block 138, "yes" leg), the code may return to block 130 to begin processing for the next block.

It is noted that, while specific functionality has been described herein as being implemented in software or hardware, the functionality implemented in software and hardware may vary from embodiment to embodiment. For example, software may allocate the address region(s) that are defined to be non-transparent memory, and the hardware may be configured to move data into and out of the non-transparent memory.

It is noted that, in some embodiments, the communication between the hardware circuits and software code being executed may be in the form of block requests and examining the contents of the returned block. Still further, the communication may be in the form of load/store commands with various attributes to identify the particular communication.

System and Computer Accessible Storage Medium

Figure 11:
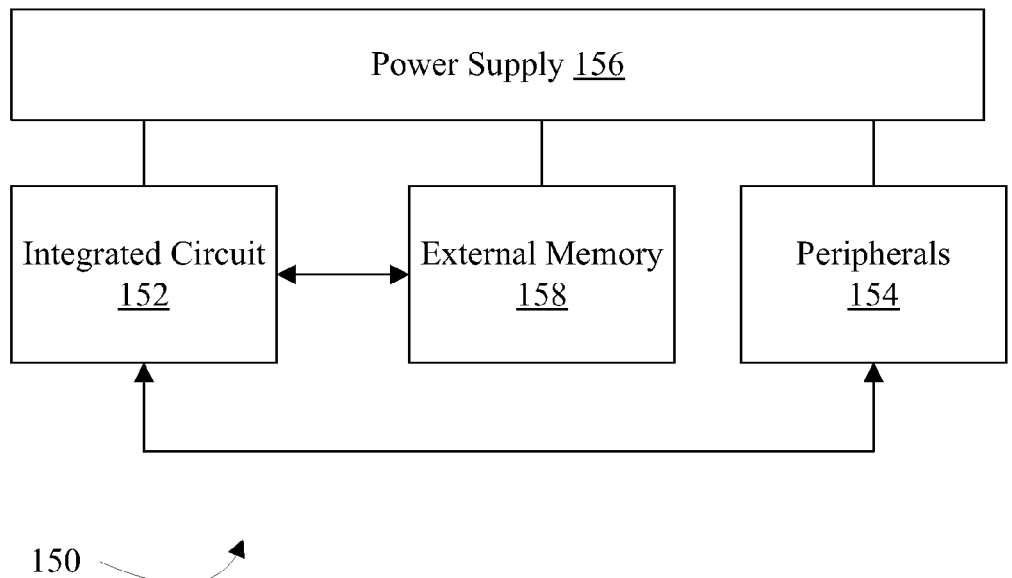
FIG. 11 is a block diagram of one embodiment of a system.

Turning next to FIG. 11, a block diagram of one embodiment of a system 150 is shown. The system 150 may be another embodiment of the system illustrated in FIG. 1. In the illustrated embodiment, the system 150 includes at least one instance of an integrated circuit 152 coupled to one or more peripherals 154 and an external memory 158. The integrated circuit 152 may include the GPUs 10, the CPUs 22, the L2 caches 12 and 24, the MCMBs 14, the memories 16, and the control units 18. The external memory 158 may include the main memory system 20. A power supply 156 is also provided which supplies the supply voltages to the integrated circuit 152 as well as one or more supply voltages to the memory 158 and/or the peripherals 154. In some embodiments, more than one instance of the integrated circuit 152 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

Figure 12:
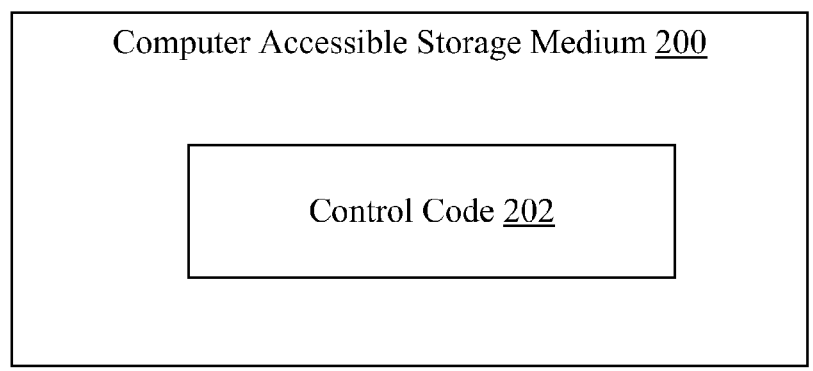
FIG. 12 is a block diagram of one embodiment of a computer accessible storage medium.

Turning now to FIG. 12, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. The computer accessible storage medium 200 in FIG. 12 may store control code 202, which may include the code described above with regard to FIGS. 6 and/or 10. Generally, the computer accessible storage medium 200 may store any set of instructions which, when executed, implement a portion or all of the operation shown in FIGS. 6 and 10. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A non-transitory computer accessible storage medium storing a plurality of instructions which, when executed on a processor that is coupled to a memory configurable into a transparent portion and a non-transparent portion:
determine a size of the transparent portion; and
program the memory to delineate the non-transparent portion and the transparent portion, limiting the transparent portion to the determined size and permitting a remainder of the memory to be accessed non-transparently, wherein the non-transparent portion and the transparent portion are non-overlapping and wherein the size of the transparent portion is greater than zero and a size of the non-transparent portion is also greater than zero, wherein the transparent portion is configured to store copies of data that are also stored in a main memory, and wherein the non-transparent portion is directly mapped to a memory address range in a memory address space to which the main memory is also directly mapped for one or more other address ranges of the memory address space.

2. The non-transitory computer accessible storage medium as recited in claim 1 wherein the plurality of instructions, when executed, allocate the memory address range to the non-transparent portion of the memory.

3. The non-transitory computer accessible storage medium as recited in claim 2 wherein the memory address range is mapped to the non-transparent portion and wherein the memory completes read/write operations in the non-transparent portion without a hit determination, whereby the read/write operations do not proceed beyond the memory in a memory hierarchy that includes the memory and the main memory.

4. The non-transitory computer accessible storage medium as recited in claim 2 wherein the plurality of instructions which, when executed, allocate the memory address range comprise instructions which, when executed, write one or more page table entries for addresses in the memory address range, each page table entry including a non-transparent attribute identifying the corresponding page as non-transparent.

5. The non-transitory computer accessible storage medium as recited in claim 2 wherein the plurality of instructions which, when executed, allocate the memory address range comprise instructions which, when executed, write one or more registers that describe the memory address range and are compared to addresses of memory requests to generate a non-transparent attribute for each memory request.

6. The non-transitory computer accessible storage medium as recited in claim 1 wherein the plurality of instructions, when executed, manage a content of the non-transparent portion.

7. The non-transitory computer accessible storage medium as recited in claim 6 wherein the plurality of instructions which, when executed, manage the content of the non-transparent portion comprise instructions which, when executed, assign block types to blocks of the non-transparent portion, wherein a control circuit associated with the memory is configured to automatically move data between the non-transparent portion and a main memory responsive to the block types.

8. The non-transitory computer accessible storage medium as recited in claim 7 wherein a block type of static read causes the control circuit to automatically fill data into the block from an address outside the memory address range assigned to the block in response to the plurality of instructions, when executed, activating the block in the non-transparent portion.

9. The non-transitory computer accessible storage medium as recited in claim 7 wherein a block type of static write causes the control circuit to automatically flush data from the block to an address outside the memory address range assigned to the block in response to the plurality of instructions, when executed, deactivating the block in the non-transparent portion.

10. The non-transitory computer accessible storage medium as recited in claim 7 wherein a block type of static read/write causes the control circuit to automatically fill data into the block from a first address outside the memory address range assigned to the block in response to the plurality of instructions, when executed, activating the block in the non-transparent portion, and further causes the control circuit to automatically flush the data to the first address in response to the plurality of instructions, when executed, deactivating the block in the non-transparent portion.

11. A system comprising:
a memory unit including a memory having a first portion and a second portion, wherein the memory unit is configured to manage the first portion transparent to software and is configured to store copies of data stored in main memory in the first portion, and wherein the memory unit is configured to manage the second portion as non-transparent to software and is mapped directly to a memory address range in a memory address space to which the memory main is also directly mapped for one or more other address ranges in the memory address space;
one or more processors configured to execute instructions, wherein the one or more processors are coupled to the memory unit; and
a computer accessible storage medium coupled to the one or more processors, the computer accessible storage medium storing a plurality of instructions which, when executed on the one or more processors:
allocate the memory address range to the second portion of the memory; and
manage a content of the second portion.

12. The system as recited in claim 11 wherein the plurality of instructions, when executed:
determine a size of the first portion; and
program the memory unit to delineate the first portion and the second portion, limiting the first portion to the determined size and permitting a remainder of the memory to be the second portion, wherein the first portion and the second portion are non-overlapping and wherein the size of the first portion is greater than zero and a size of the second portion is also greater than zero.

13. The system as recited in claim 11 wherein the memory unit is configured to complete read/write operations in the second portion without a cache hit determination, whereby the read/write operations do not proceed beyond the memory in a memory hierarchy of the system.

14. The system as recited in claim 11 wherein the plurality of instructions which, when executed, allocate the memory address range comprise instructions which, when executed, write one or more page table entries for addresses in the memory address range, each page table entry including a non-transparent attribute identifying the corresponding page as non-transparent.

15. The system as recited in claim 11 wherein the plurality of instructions which, when executed, allocate the memory address range comprise instructions which, when executed, write one or more registers that describe the memory address range and are compared to addresses of memory requests to generate a non-transparent attribute for each memory requests.

16. The system as recited in claim 11 wherein the plurality of instructions which, when executed, manage the content of the second portion comprise instructions which, when executed, assign block types to blocks of the second portion.

17. The system as recited in claim 16 wherein the memory unit is configured to automatically move data between the memory and a main memory responsive to the block types.

18. The system as recited in claim 17 wherein a block type of static read causes the memory unit to automatically fill data into the block from an address outside the memory address range assigned to the block in response to the plurality of instructions, when executed, activating the block in the second portion.

19. The system as recited in claim 17 wherein a block type of static write causes the memory unit to automatically flush data from the block to an address outside the memory address range assigned to the block in response to in response to the plurality of instructions, when executed, deactivating the block in the second portion.

20. The system as recited in claim 17 wherein a block type of static read/write causes the memory unit to automatically fill data into the block from a first address outside the memory address range assigned to the block in response to the plurality of instructions, when executed, activating the block in the non-transparent portion, and further causes the memory unit to automatically flush the data to the first address in response to the plurality of instructions, when executed, deactivating the block in the second portion.

\* \* \* \* \*